US009956863B2

(12) United States Patent
Petersen et al.

(10) Patent No.: US 9,956,863 B2
(45) Date of Patent: May 1, 2018

(54) ELECTRIC DRIVE, METHOD FOR THE OPERATION THEREOF, AND SERIAL HYBRID DRIVE TRAIN FOR A MOTOR VEHICLE

(71) Applicant: VOLKSWAGEN AKTIENGESELLSCHAFT, Wolfsburg (DE)

(72) Inventors: Rainer Petersen, Wolfsburg (DE); Jörg Möckel, Sassenburg (DE); Armin Sue, Meine (DE); Henning Strauss, Uetze (DE); Robert Plikat, Ummern (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days. days.

(21) Appl. No.: 15/256,662

(22) Filed: Sep. 5, 2016

(65) Prior Publication Data
US 2016/0368363 A1    Dec. 22, 2016

Related U.S. Application Data

(63) Continuation of application No. PCT/EP2015/050609, filed on Jan. 14, 2015.

(30) Foreign Application Priority Data

Mar. 5, 2014    (DE) .................. 10 2014 203 999

(51) Int. Cl.
*B60K 6/50*    (2007.10)
*B60L 3/00*    (2006.01)
(Continued)

(52) U.S. Cl.
CPC .............. *B60K 6/50* (2013.01); *B60K 6/26* (2013.01); *B60K 6/365* (2013.01); *B60L 3/0061* (2013.01);
(Continued)

(58) Field of Classification Search
None
See application file for complete search history.

(56) References Cited

U.S. PATENT DOCUMENTS 4,691,119 A    9/1987    McCabria
4,779,486 A    10/1988    Schumacher
(Continued)

FOREIGN PATENT DOCUMENTS

CN    101836356 A    9/2010
DE    728469 C    11/1942
(Continued)

OTHER PUBLICATIONS

Search Report including Provisional Assessment of Patentability issued by the German Patent and Trademark Office for German Patent Application No. DE 10 2014 203 999.1, dated May 7, 2014.
(Continued)

*Primary Examiner* — Shelly Chen
(74) *Attorney, Agent, or Firm* — Manfred Beck, P.A.

(57) ABSTRACT

An electric drive includes a motor assembly, an output assembly, a transmission stage and one or more power electronics units connected to one or more electric voltage sources in order to control electrical sub-phases of electric machines of the motor assembly. The electric machines have motor shafts disposed parallel to one another. The transmission stage is connected to the motor assembly and also connected to the output assembly. The transmission stage has a transmission sun connected to the output assembly and has a plurality of transmission planets each connected to a respective one of the electric machines. The transmission planets are each fixed on a respective one of the motor shafts and are disposed in an annular manner around the transmission sun and roll on the transmission sun in a torque- (Continued)

transmitting manner. A method for operating an electric drive and a serial hybrid drive train are also provided.

19 Claims, 8 Drawing Sheets

(51) Int. Cl.
| | |
|---|---|
| B60L 11/12 | (2006.01) |
| B60L 11/14 | (2006.01) |
| B60L 11/18 | (2006.01) |
| B60L 15/20 | (2006.01) |
| H02K 7/116 | (2006.01) |
| H02K 16/00 | (2006.01) |
| H02K 11/21 | (2016.01) |
| H02K 11/25 | (2016.01) |
| H02K 11/33 | (2016.01) |
| B60K 6/26 | (2007.10) |
| B60K 6/365 | (2007.10) |
| B60W 10/08 | (2006.01) |
| B60W 20/10 | (2016.01) |
| F16H 3/72 | (2006.01) |
| H02P 5/00 | (2016.01) |

(52) U.S. Cl.
CPC ............ *B60L 11/123* (2013.01); *B60L 11/14* (2013.01); *B60L 11/1864* (2013.01); *B60L 11/1868* (2013.01); *B60L 15/2036* (2013.01); *B60L 15/2054* (2013.01); *B60W 10/08* (2013.01); *B60W 20/10* (2013.01); *F16H 3/727* (2013.01); *H02K 7/116* (2013.01); *H02K 11/21* (2016.01); *H02K 11/25* (2016.01); *H02K 11/33* (2016.01); *H02K 16/00* (2013.01); *H02P 5/00* (2013.01); *B60L 2210/40* (2013.01); *B60L 2220/12* (2013.01); *B60L 2220/14* (2013.01); *B60L 2220/42* (2013.01); *B60L 2240/421* (2013.01); *B60L 2240/423* (2013.01); *B60L 2240/425* (2013.01); *B60L 2240/429* (2013.01); *B60L 2240/48* (2013.01); *B60L 2240/486* (2013.01); *B60L 2240/529* (2013.01); *B60L 2260/44* (2013.01); *B60Y 2200/92* (2013.01); *B60Y 2300/60* (2013.01); *B60Y 2400/73* (2013.01); *Y02T 10/6217* (2013.01); *Y02T 10/641* (2013.01); *Y02T 10/645* (2013.01); *Y02T 10/648* (2013.01); *Y02T 10/7005* (2013.01); *Y02T 10/7061* (2013.01); *Y02T 10/7066* (2013.01); *Y02T 10/7077* (2013.01); *Y02T 10/7241* (2013.01); *Y02T 10/7275* (2013.01); *Y10S 903/906* (2013.01); *Y10S 903/91* (2013.01)

(56) References Cited

U.S. PATENT DOCUMENTS

| | | |
|---|---|---|
| 4,798,999 A | 1/1989 | Tecinsky |
| 4,848,188 A | 7/1989 | Schumacher |
| 7,965,007 B2 | 6/2011 | Dahlen |
| 2005/0140230 A1 | 6/2005 | Johnson et al. |
| 2008/0197810 A1 | 8/2008 | Ishikawa et al. |
| 2010/0207559 A1 | 8/2010 | Imai |
| 2011/0280699 A1 | 11/2011 | Zimmermann et al. |
| 2016/0114676 A1 | 4/2016 | Petersen et al. |

FOREIGN PATENT DOCUMENTS

| | | |
|---|---|---|
| DE | 737859 C | 7/1943 |
| DE | 3617688 A1 | 12/1986 |
| DE | 4402337 A1 | 8/1995 |
| DE | 20201748 U1 | 7/2002 |
| DE | 10034469 A1 | 9/2002 |
| DE | 102005061006 A1 | 6/2007 |
| DE | 102006040144 A1 | 2/2008 |
| DE | 102009045869 A1 | 4/2011 |
| DE | 102013212867 A1 | 1/2015 |
| DE | 102013212868 A1 | 1/2015 |
| EP | 0211000 B1 | 3/1991 |
| EP | 2460941 A1 | 6/2012 |
| GB | 2175656 A | 12/1986 |
| JP | H06153325 A | 5/1994 |
| JP | 2010206904 A | 9/2010 |
| WO | 2007071715 A1 | 6/2007 |
| WO | 2010031511 A1 | 3/2010 |
| WO | 2011013347 A1 | 2/2011 |

OTHER PUBLICATIONS

International Search Report for Internatioal Application No. PCT/EP2015/050609 and translation thereof, dated Sep. 9, 2015.
International Preliminary Report on Patentability for International Application No. PCT/EP2015/050609 including Written Opinion of the International Searching Authority and translation thereof, dated Sep. 6, 2016.
The First Office Action issued by the State Intellectual Property Office of People's Republic of China, dated May 11, 2017, which corresponds to Chinese Patent Application No. 201580012029.4 and is related to U.S. Appl. No. 15/256,662; with English language translation and associated Search Report.

ELECTRIC DRIVE, METHOD FOR THE OPERATION THEREOF, AND SERIAL HYBRID DRIVE TRAIN FOR A MOTOR VEHICLE

CROSS-REFERENCE TO RELATED APPLICATIONS

This application is a continuation, under 35 U.S.C. § 120, of copending International Application No. PCT/EP2015/050609, filed Jan. 14, 2015, which designated the United States; this application also claims the priority, under 35 U.S.C. §119, of German Patent Application No. DE 10 2014 203 999.1, filed Mar. 5, 2014; the prior applications are herewith incorporated by reference in their entirety.

BACKGROUND OF THE INVENTION

Field of the Invention

The invention relates to an electric drive including a motor assembly with a plurality of electric machines having motor shafts disposed parallel to one another, an output assembly, and a transmission stage, which is connected to the motor assembly and also to the output assembly and which has a transmission sun connected to the output assembly and a plurality of transmission planets, which are each connected to one of the electric machines and which are each fixed on the motor shafts and are disposed annularly around the transmission sun and roll on the transmission sun in a torque-transmitting manner. The invention also relates to a method for operating such an electric drive. The invention further relates to the use of an electric drive according to the invention and of the method according to the invention in a serial hybrid drive train for a motor vehicle.

Generic electric drives are known from European Patent Specification EP 0 211 000 B1. This document discloses an electromechanical precision drive system including a plurality of individual electric motors which are disposed in a ring with rotor shafts oriented in parallel. Each rotor shaft of the known system supports a spur gear which meshes with a common sun gear, which is disposed in the center of the ring formed by the planet gears. This configuration serves to sum the low torques of the individual electric machines to form a high overall torque, which can be tapped at the output shaft connected to the sun.

German Patent Application DE 10 2013 212 868, which was published after the filing date of the parent application of the instant application, describes a concept which favors the use of an electric drive of this type in a motor vehicle. In particular, this German patent application concerns advantageous details of the transmission stage which enable the use of what are called maximum speed motors, i.e. electric machines having rotational speeds of more than 20,000 rpm, and which are characterized by outstanding efficiency and running smoothness, as electric machines of the drive currently under discussion. German Patent Application DE 10 2013 212 867, which was published after the priority date of the instant application, describes details of the coupling of a drive composed of electric machines disposed in a ring to the downstream elements of a motor vehicle drive train. The invention of the instant application is understood primarily to be a supplementation to the aforementioned inventions, with which it is preferably used together in combination, but can also be used independently thereof.

The above-mentioned generic European Patent Specification EP 0 211 000 B1 alone teaches an independent synchronous control of all electric machines of the drive, but does not disclose any details in this regard.

SUMMARY OF THE INVENTION

It is accordingly an object of the invention to provide an electric drive which overcomes disadvantages of the heretofore-known electric drives of this general type. It is in particular an object of the invention to provide structural and control engineering details for a known electric drive so that synergy effects which can result from the use of a plurality of electric machines are sensibly utilized. It is another object of the invention to provide a method for operating an electric drive. A further object of the invention is to provide a serial hybrid drive train for a motor vehicle.

With the foregoing and other objects in view there is provided, in accordance with the invention, an electric drive, including:
a motor assembly including a plurality of electric machines with motor shafts disposed parallel to one another;
an output assembly;
a transmission stage connected to the motor assembly and also connected to the output assembly;
the transmission stage having a transmission sun connected to the output assembly and having a plurality of transmission planets each connected to a respective one of the electric machines, the transmission planets each being fixed on a respective one of the motor shafts and being disposed in an annular manner around the transmission sun and rolling on the transmission sun in a torque-transmitting manner; and
one or more power electronics units connected to one or more electric voltage sources in order to control electrical sub-phases of the electric machines.

In other words, according to the invention, there is provided an electric drive, including:
a motor assembly with a plurality of electric machines having motor shafts disposed parallel to one another;
an output assembly; and
a transmission stage, which is connected on the one hand to the motor assembly and on the other hand to the output assembly and which has a transmission sun connected to the output assembly and a plurality of transmission planets, which are each connected to one of the electric machines and which are each fixed on the motor shafts and are disposed in a ring around the transmission sun and roll over the transmission sun in a torque-transmitting manner, wherein one or more power electronics units connected to one or more electric voltage sources are provided in order to control the electrical sub-phases of the electric machines. This configuration constitutes the prerequisite for the particularly advantageous embodiments described hereinafter, which form the subject matter of the dependent claims.

According to a preferred feature of the invention, each respective one of the electric machines is connected to a respective separate one of the power electronics units.

Thus, in a preferred embodiment provision is made for all electric machines to each be connected to a separate power electronics unit. This allows a maximum flexibility of the control of the electric drive—an advantage which must be weighed up in each individual case against the costs associated with the use of a plurality of power electronics units and the corresponding installation space requirement.

According to another feature of the invention, two or more of the electric machines are electrically connected to one another and are thus connected or connectable to a same one of the power electronics units.

Thus, in another embodiment of the invention, which likewise is advantageous, provision is made for two or more electric machines to be electrically connected to one another and thus connected or connectable to the same power electronics unit. This concept provides, in particular, a hard wiring of windings of different electric machines. These hard wiring solutions can be permanent or switchable. It is thus possible to control different electric machines via the same power electronics unit. In the case of a permanent hard wiring, a power electronics unit is permanently assigned to a number of electric machines. In the case of switchable hard wiring solutions, the assignment of power electronics units and electric machines can be varied as required, in particular during operation.

According to another feature of the invention, different ones of the power electronics units are connected to respective different ones of the electric voltage sources.

Thus, a development of the invention which can be used for both aforementioned alternatives makes provision for different power electronics units to be connected to different voltage sources. By way of example, the assignment can be made in respect of different operating voltage requirements or in respect of the state of charge of individual electrical energy stores serving as voltage source. The connection of the power electronics units to the voltage sources can be permanent or switchable. The latter variant allows a greater flexibility.

According to another feature of the invention, each of the power electronics units is regulated via a respective regulator, wherein movement parameters of the output assembly and/or the transmission stage are fed back to the respective regulator.

In other words, each power electronics unit is favorably regulated via a regulator, to which movement parameters of the output assembly and/or the transmission assembly are fed back. A regulation of this type, which is known in principle, of power electronics units is conceivable within the scope of the present invention in particular in two advantageous variants.

According to another feature of the invention, the electric drive includes regulators, wherein each of the power electronics units is regulated via a respective one of the regulators, wherein movement parameters of the output assembly and/or the transmission stage are fed back to at least one of the regulators; and a given one of the regulators for a given one of the power electronics units is configured as a master regulator and further ones of the regulators for respective further ones of the power electronics units are configured as slave regulators, wherein the slave regulators are dependent on the master regulator.

Thus, in a first variant provision is made for the regulator of a first power electronics unit to be configured as master regulator and for the regulators of further power electronics units to be configured as slave regulators dependent on the master regulator. This variant has the advantage that only the master regulator requires a feedback to movement parameters of downstream elements of the drive train. The outlay for sensor technology and data communication is therefore particularly low in this variant.

Alternatively, to the above described first variant, provision can of course also be made for all regulators to be configured as individual regulators independent of one another. This indeed requires a supply of each separate regulator with feedback sensor data, but allows maximum flexibility with regard to the regulation of the individual electric machines.

Thus, according to another feature of the invention, the power electronics units are regulated via respective regulators, wherein movement parameters of the output assembly and/or the transmission stage are fed back to the regulators, and wherein all of the regulators are configured as individual regulators independent of one another.

It should be noted that it is possible within the scope of the present invention, but not absolutely necessary, for each power electronics unit to be assigned precisely one regulator, and conversely for each regulator to be assigned precisely one power electronics unit. Rather, it is also possible that a regulator can be used for the joint regulation of a number of power electronics units. The corresponding coupling can be permanent or switchable.

According to another feature of the invention, the electric drive includes sensors for a direct detection of values of given operating parameters in some of the electric machines and for estimating values, not directly detected, of the given operating parameters in other ones of the electric machines.

Apart from movement parameters of elements of the drive train downstream of the electric machines, operating parameters of the electric machines themselves can also be useful or even necessary for the drive train control or for other control tasks. When detecting these parameters, substantial synergy effects can be used. In one development of the invention provision is thus made for sensors to be provided for the direct detection of values of certain operating parameters in some of the electric machines as well as for estimating not directly detected values of the same operating parameters in other electric machines. The term "sensor" here includes not only the actual measurement head, but also the evaluation of the respective measured values. In accordance with the specified development of the invention, not all required operating parameters have to be detected individually and directly. Rather, some values recorded at selected electric machines can be indicative of corresponding values at other electric machines, without these having to be directly measured themselves. The direct measurement is therefore replaced by knowledge of the relationships in the system as a whole, which corresponds to a particularly advantageous utilization of synergy effects.

According to another feature of the invention, the electric machines are grouped according to different construction types.

According to yet another feature of the invention, the electric machines are provided in groups such that the electric machines are grouped according to different construction types; and sensors are provided for a direct detection of values of given operating parameters in some of the electric machines and also for estimating values, not directly detected, of the given operating parameters in other ones of the electric machines such that for a given one of the given operating parameters only one corresponding one of the sensors is provided for each respective one of the groups.

Thus, for example, provision can be made for the electric machines to be grouped according to different construction types. By way of example, asynchronous motors, permanent-magnet-excited motors, and DC machines are known to a person skilled in the art. All three construction types have different advantages and disadvantages. The permanent-magnet-excited motors have the advantage of the adjustable magnetization current and a frequency-proportional rotational speed. However, the permanent magnets are disadvantageous with regard to cost and weight. In addition, high voltages develop in the event of a fault, since the excitation cannot be interrupted. Furthermore, the regulation of electric machines of this type is rather complex, since synchronicity between field and rotor frequency must be taken into consideration. Asynchronous machines, by contrast, are advantageous with regard to weight and cost on account of the absence of permanent magnets and also offer considerable advantages in the event of a fault on account of their interruptible excitation. By contrast, a disadvantage in the case of asynchronous machines is the need to provide reactive exciter power in order to generate the air-gap field with the stator current. The use of different construction types within a drive according to the invention makes it possible to utilize the advantages of each individual construction type and to reduce the disadvantages. Since different operating parameters are of importance for the control of the construction type, provision can be made for just one corresponding sensor to be provided for each construction type group of the electric machines for a certain operating parameter. With identical control, the same operating parameter does not need to be measured for each individual electric machine of a construction type group. The corresponding sensors can therefore be eliminated.

According to another feature of the invention, the electric machines are controlled differently in groups.

According to yet another feature of the invention, the electric drive includes sensors for a direct detection of values of given operating parameters in some of the electric machines and also for estimating values, not directly detected, of the given operating parameters in other ones of the electric machines; and the electric machines are controlled differently in groups such that for a given one of the given operating parameters only one corresponding one of the sensors is provided for each respective one of the groups.

Thus, regardless of differences in the construction type, provision can also be made for the electric machines to be controlled differently in groups, i.e. the electric machines are group-wise differently controlled. Here as well, different operating parameters can be of importance for different controls. For utilization of synergy effects, provision can thus be made for just one corresponding sensor to be provided for each control group of the electric machines for a certain operating parameter. The rest of the electric machines, controlled identically, within the same control group do not require a separate sensor, since their corresponding operating parameter value is estimated to be identical to the value measured directly.

According to another feature of the invention, the electric drive includes current sensors which are provided for a direct detection of some controlled sub-phases and for an estimation of other sub-phases, not directly detected, of the electric machines.

According to another feature of the invention, the electric drive includes position sensors which are provided for a direct detection of rotational positions of some of the electric machines and for an estimation of rotational positions, not directly detected, of other ones of the electric machines.

According to another feature of the invention, the electric drive includes temperature sensors which are provided for a direct detection of temperatures of some of the electric machines and for an estimation of temperatures, not directly detected, of other ones of the electric machines.

The specific operating parameter that is directly measured or, respectively, estimated through the use of the sensor technology discussed in general above is dependent on the requirements of each individual case. By way of example, provision can thus be made for current sensors to be provided for the direct detection of some controlled sub-phases as well as for the estimation of other, not directly detected sub-phases of the electric machines. Alternatively or additionally, position sensors for the direct detection of rotational positions of some of the electric machines as well as for the estimation of rotational positions, not directly detected, of other electric machines can be provided. Alternatively or additionally, temperature sensors for the direct detection of temperatures of some of the electric machines as well as the estimation of temperatures, not directly detected, of other electric machines can also be provided. Of course, other operating parameters can be detected or estimated alternatively or additionally with utilization of the above-explained synergy effects.

In general terms, there is also provided a method for operating an electric drive in accordance with the invention wherein the electric machines are controlled differently in groups. Specifically, with the objects of the invention in view there is provided, a method for operating an electric drive, wherein the method includes the steps of:

providing a motor assembly, an output assembly, and a transmission stage, wherein the motor assembly has a plurality of electric machines with motor shafts disposed parallel to one another, wherein the transmission stage is connected to the motor assembly and also connected to the output assembly, wherein the transmission stage has a transmission sun connected to the output assembly and has a plurality of transmission planets each connected to a respective one of the electric machines, wherein the transmission planets are each fixed on a respective one of the motor shafts and are disposed in an annular manner around the transmission sun and roll on the transmission sun in a torque-transmitting manner;

controlling electrical sub-phases of the electric machines with one or more power electronics units connected to one or more electric voltage sources; and controlling the electric machines differently in groups.

According to another mode of the invention, the step of controlling the electric machines differently in groups includes operating a first group of the electric machines as a motor and operating a second group of the electric machines as a generator.

Thus, within the scope of a preferred operating method, as an example for a drive according to the invention including different control groups of its electric machines, provision can be made for a first group of the electric machines to be operated as a motor and for a second group of the electric machines to be operated as a generator. The drive can thus be operated in principle as a "mechanical voltage transformer", for example when each control group is connected to a different voltage source or energy store. A drive operated in accordance with an operating method of this type is suitable in particular for use in a serial hybrid drive train for a motor vehicle, including an internal combustion engine, an output assembly, an electrical energy store, at least one electric machine coupled mechanically to the internal combustion engine and electrically to the electrical energy store and operated as a generator, and also at least one electric machine coupled mechanically to the output assembly and electrically to the electrical energy store and operated as a motor. Here, the electric machines of a first control group, controlled specifically as a generator, are connected to the internal combustion engine, and the electric machines of a further control group, specifically operated as a motor, are connected to the output assembly. For reasons of installation space, the motor shafts disposed parallel to one another are preferably oriented anti-parallel here. In other words, the drive according to the invention can be positioned physically between the internal combustion engine and the output assembly, wherein the planet gears of the control group operated as a generator interact with the internal combustion engine and the planet gears of the control group operated as a motor interact with the output assembly.

According to another mode of the invention, the step of controlling the electric machines differently in groups includes operating different groups of the electric machines with a different slip of their transmission planets relative to the transmission sun.

Another example for the different control of electric machines of different control groups within the drive according to the invention relates to the slip thereof. In one embodiment of the invention provision can thus be made for different groups of the electric machines to be operated with different slip of their transmission planets relative to the transmission sun. In the extreme case this can be provided to such an extent that the interaction of individual transmission planets with the transmission sun is completely cancelled, and therefore the corresponding electric machine can be completely deactivated. This serves to avoid drag losses in cases in which only a low torque is necessary at the transmission sun. An operating method of this type lends itself in particular in cases in which the transmission stage is configured as a friction stage, i.e. in which the transmission planets interact frictionally with the transmission sun. In cases of a form-fitting interaction, for example in the case of a gear wheel stage, a slip regulation is indeed also possible, but does not lead to advantages to the same extent.

According to another mode of the invention, the step of controlling the electric machines differently in groups includes operating, with a time offset relative to one another, different groups of the electric machines temporarily with overload and temporarily with underload.

In combination with the aforementioned variant or independently thereof, provision can be made for different groups of the electric machines to be operated temporarily with overload and temporarily with underload at different times. This results in a high flexibility due to the possibility of temporary shifting of the system operating points, wherein a system overload is ruled out, since electric machines operated temporarily with overload, which can heat up significantly during this process, can cool down again during their operating phases in underload, wherein previously cooled machines are available for temporary use in overload.

With the objects of the invention in view there is also provided, a serial hybrid drive train for a motor vehicle, including an internal combustion engine, an output assembly, an electrical energy store, at least one electric machine coupled mechanically to the internal combustion engine and electrically to the electrical energy store and operated as a generator, and also at least one electric machine coupled mechanically to the output assembly and electrically to the electrical energy store and operated as a motor, wherein the electric machines are parts of an electric drive, wherein the electric machines are controlled differently in groups, wherein the electric drive can be operated such that a first group of the electric machines is operated as a motor and a second group of the electric machines is operated as a generator.

Specifically, in accordance with the invention, there is also provided a serial hybrid drive train for a motor vehicle, including:
an internal combustion engine;
an electrical energy store;
an electric drive including a motor assembly with a plurality of electric machines, the electric machines having motor shafts disposed parallel to one another;
the electric drive further including an output assembly, a transmission stage and one or more power electronics units connected to one or more electric voltage sources in order to control electrical sub-phases of the electric machines;
at least one of the electric machines being coupled mechanically to the internal combustion engine and electrically to the electrical energy store and being operable as a generator;
at least one of the electric machines being coupled mechanically to the output assembly and electrically to the electrical energy store and being operable as a motor;
the transmission stage being connected to the motor assembly and also connected to the output assembly;
the transmission stage having a transmission sun connected to the output assembly and having a plurality of transmission planets each connected to a respective one of the electric machines, the transmission planets each being fixed on a respective one of the motor shafts and being disposed in an annular manner around the transmission sun and rolling on the transmission sun in a torque-transmitting manner; and
the electric machines being controlled differently in groups such that a first group of the electric machines is operable as a motor and a second group of the electric machines is operable as a generator.

Further features and advantages of the invention will emerge from the following specific description and the drawings and are set forth in the appended claims.

Although the invention is illustrated and described herein as embodied in an electric drive, a method for operating an electric drive, and a serial hybrid drive train for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
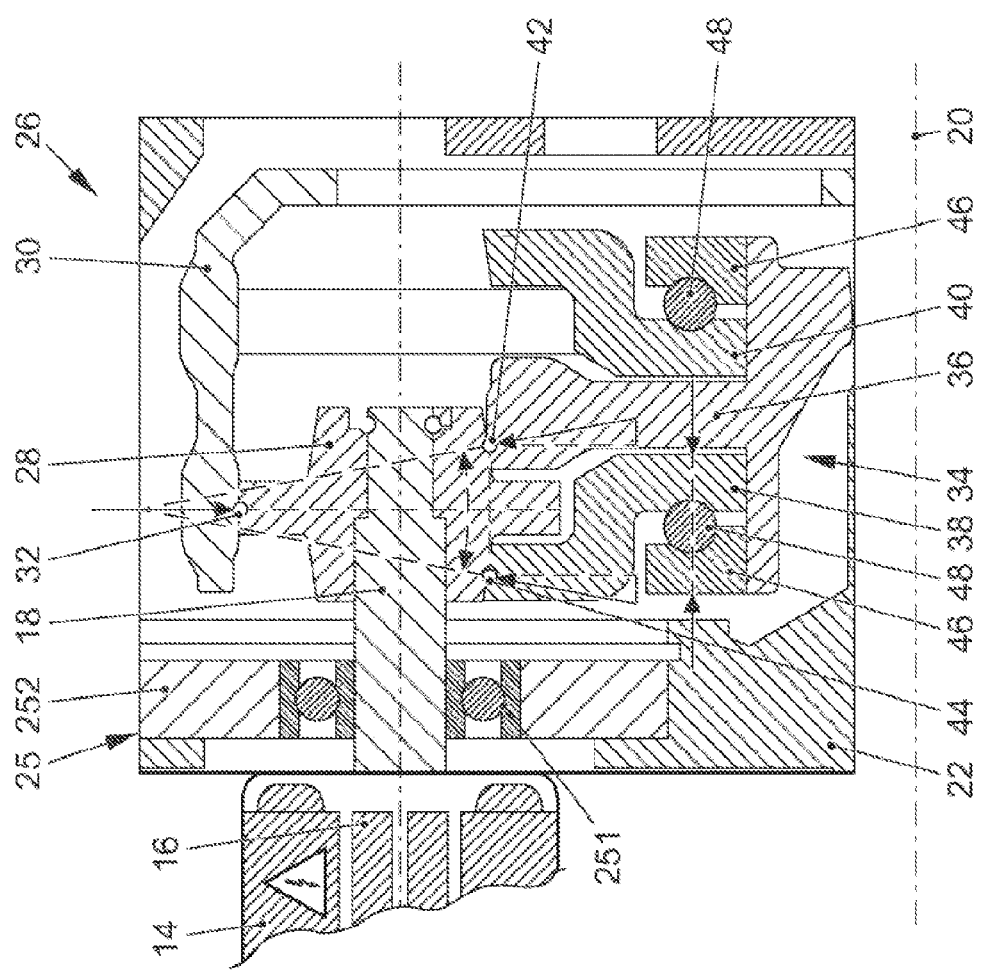
FIG. 1 is a diagrammatic sectional view of the transmission stage of a preferred embodiment according to the invention.
Figure 3:
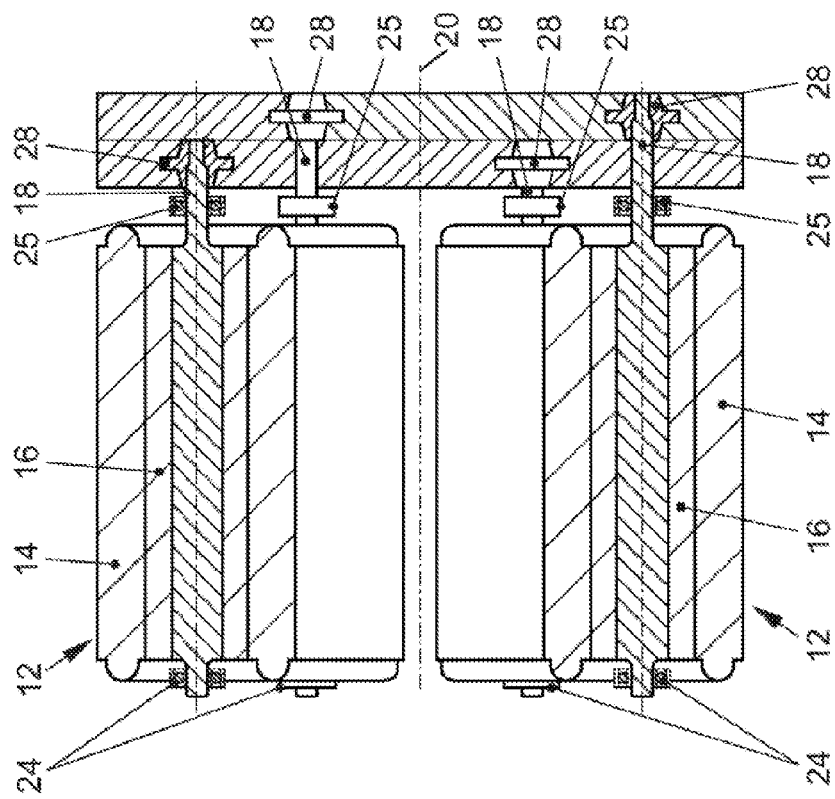
FIG. 3 is a diagrammatic partially sectioned side view of the motor assembly of a preferred embodiment according to the invention.
Figure 2:
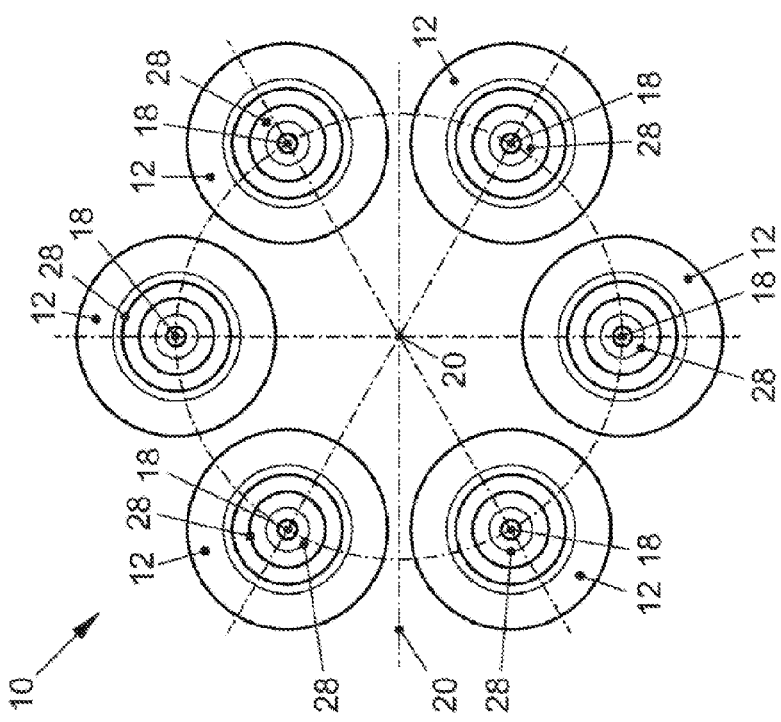
FIG. 2 is a diagrammatic elevational view of the front side of the motor assembly of a preferred embodiment according to the invention when viewed from the transmission stage side.
Figure 4:
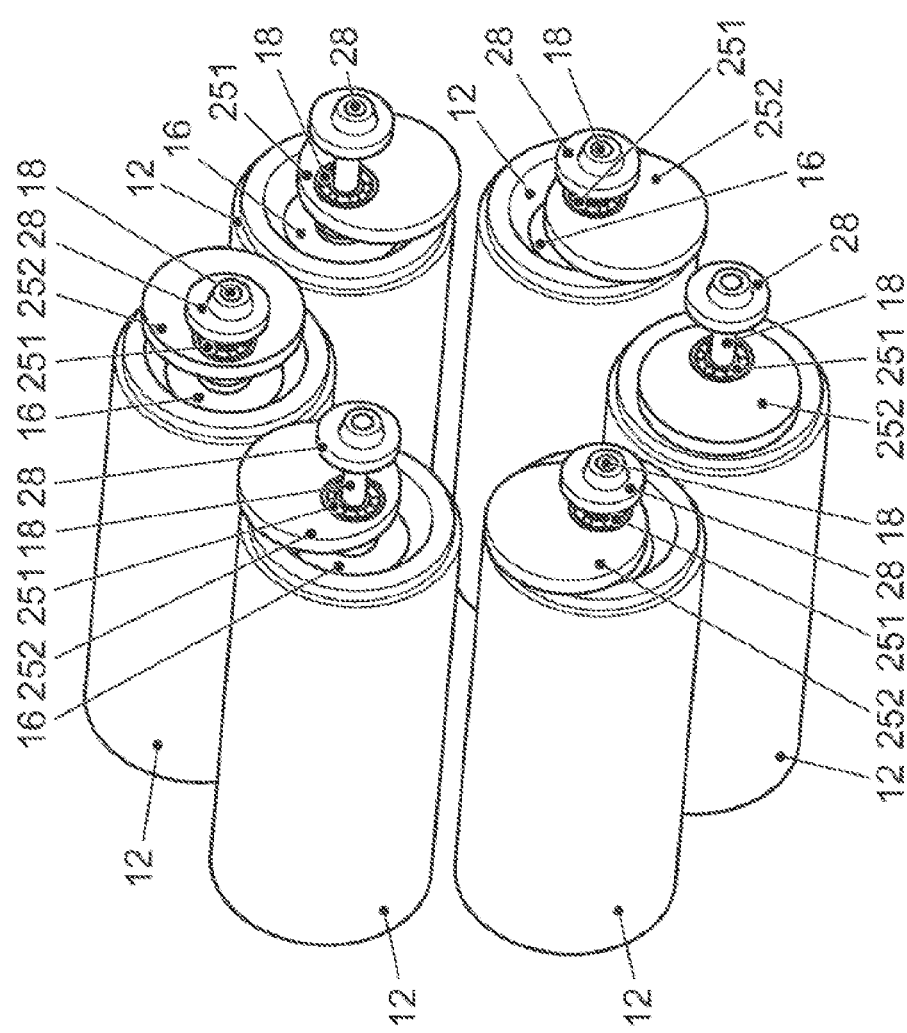
FIG. 4 is a perspective view of the motor assembly of FIGS. 2 and 3 with illustrated eccentric bearings in accordance with the invention.

Referring now to the figures of the drawings in detail, in which like reference signs in the drawings indicate like or similar elements, and referring first, particularly, to FIG. 1 thereof, there is shown a schematic sectional illustration of the transmission stage of a drive according to the invention which, for easier understanding, is to be considered favorably together with FIGS. 2, 3, and 4, which will also be described jointly. The motor assembly 10 illustrated in particular in FIGS. 2, 3, and 4 includes a plurality of electric machines 12 (six in the shown embodiment), each including a stator 14 and a rotor 16, which are disposed in a ring around a central axis 20 with rotor shafts 18 oriented in parallel and form a motor ring. The electric machines 12 are preferably maximum speed machines which can be operated with rotational speeds of more than 20,000 rpm. Whereas the stators 14 of the electric machines 12 are fixed to a housing 22, the rotor shafts 18 are mounted on the housing on either side of the rotors 16, wherein the specific embodiment of the bearings 24, 25 will be discussed in detail further below.

On one side of the electric machines 12, the rotor shafts 18 thereof are extended and project into an adjacent transmission stage 26. There, they each support a transmission planet 28 formed as a friction roller, which transmission planet is formed as a stepped planet and in a central axial region has a greater diameter than in its outer axial regions disposed on each side of the central region. The transmission planets 28 are securely fixed on the rotor shafts 18. They together form the driven input element of the transmission stage 26. This is formed as a friction roller planetary stage. A rotatably mounted ring gear 30 is disposed radially outwardly and in a contact region 32 contacts the central region of the transmission planet 28 in a frictionally engaged manner, so that it is set in rotation by the driven rotational movement of the transmission planet 28 itself. A transmission sun 34 formed in a number of parts is disposed radially inside the transmission planets 28. This transmission sun includes an axially fixedly and rotatably mounted inner sun disc 36 and two outer sun discs 38, 40, which likewise are rotatable, but additionally are disposed axially displaceably. The transmission planet 28 shown in FIG. 1 is restrained between the inner sun disc 36 and the outer sun disc 38 in such a way that both, via their contact regions 42, 44, contact, in a frictionally engaged manner, the outer axial regions of the transmission planet 28 formed with outwardly sloping shoulders. The motorized drive of the transmission planets 28 thus, in addition to the rotation of the transmission ring gear 30, also causes a rotation in an opposite direction of the transmission sun 34, wherein the speed ratios between transmission ring gear 30 and transmission sun 34 are given from the ratio of the respective contact radii between transmission planets 28 and transmission ring gear 30 on the one hand and transmission planets 28 and transmission sun 34 on the other hand. This ratio, in particular the exact contact radius between the transmission planets 28 and the transmission sun 34 is variable to a marginal extent. This variability serves primarily not for transmission adjustment, but rather for slip optimization within the transmission stage 26 formed as a friction roller planetary stage. In particular, in the illustrated embodiment, a torque-dependent, in particular torque-proportional slip control is provided. For this purpose, an end cam contact disc 46 is disposed axially outwardly adjacently to each of the outer sun discs 38, 40 and is fixedly connected to the inner sun disc 36. Each outer sun disc 38, 40 is supported via spacer elements 48 guided in ramps against the assigned end cam contact disc 46. A relative moment or relative torque occurring between the inner sun disc 36 and the outer sun discs 38, 40 in the event of motorized drive of the transmission planets 28 leads to a rotation of the outer sun discs 38, 40 relative to their respective assigned end cam contact discs, which on account of the ramp guidance of the spacer elements 48 leads to a corresponding axial displacement of the respective outer sun disc 38, 40. The contact pressure between the transmission sun 34 and the transmission planets 28 is hereby adjusted depending on the transmitting torque, in particular proportionally thereto. On account of the bevels of the contact regions 42, 44 between transmission sun 34 and transmission planets 28, this additionally leads to a slight radial displacement of the transmission planets 28 and therefore to a corresponding change in contact pressure in the contact region 32 between transmission planets 28 and transmission ring gear 30. This transmission region is preferably held axially flat, so that there is no change with respect to the contact pressure or the contact radius between transmission planets 28 and transmission ring gear 30, not even when there is a slight axial displacement of the transmission planets 28.

The meaning of the double embodiment of the outer sun discs 38, 40 will become clear in particular from the illustration of FIG. 3. In the illustrated embodiment, three of the six electric machines 12 are provided with a shorter rotor shaft 18, and the three other electric machines 12 are provided with a longer rotor shaft 18. The rotor shafts reach to a further or lesser extent into the transmission stage 26 accordingly, such that in each case two transmission planets 28 azimuthally adjacent to one another interact with the same inner sun disc 36, but with different outer sun discs 38, 40. This cooperation in groups of in each case three electric machines 12, as illustrated in the drawings, is particularly advantageous, but is not absolutely necessary. In the case of an arrangement or grouping of the electric machines of this type, it is particularly advantageous that each group of electric machines represents a control group in the sense of this application.

As mentioned, the contact pressure control between transmission sun 34 and transmission planets 28 is associated with a marginal axial and radial displacement of the latter. This is not unproblematic, since they are securely fixed on the rotor shafts 18 of the electric machines 12. The aforementioned movement thus continues also on the respective rotor shaft 18, which should be taken into consideration when it comes to the mounting thereof.

Figure 5:
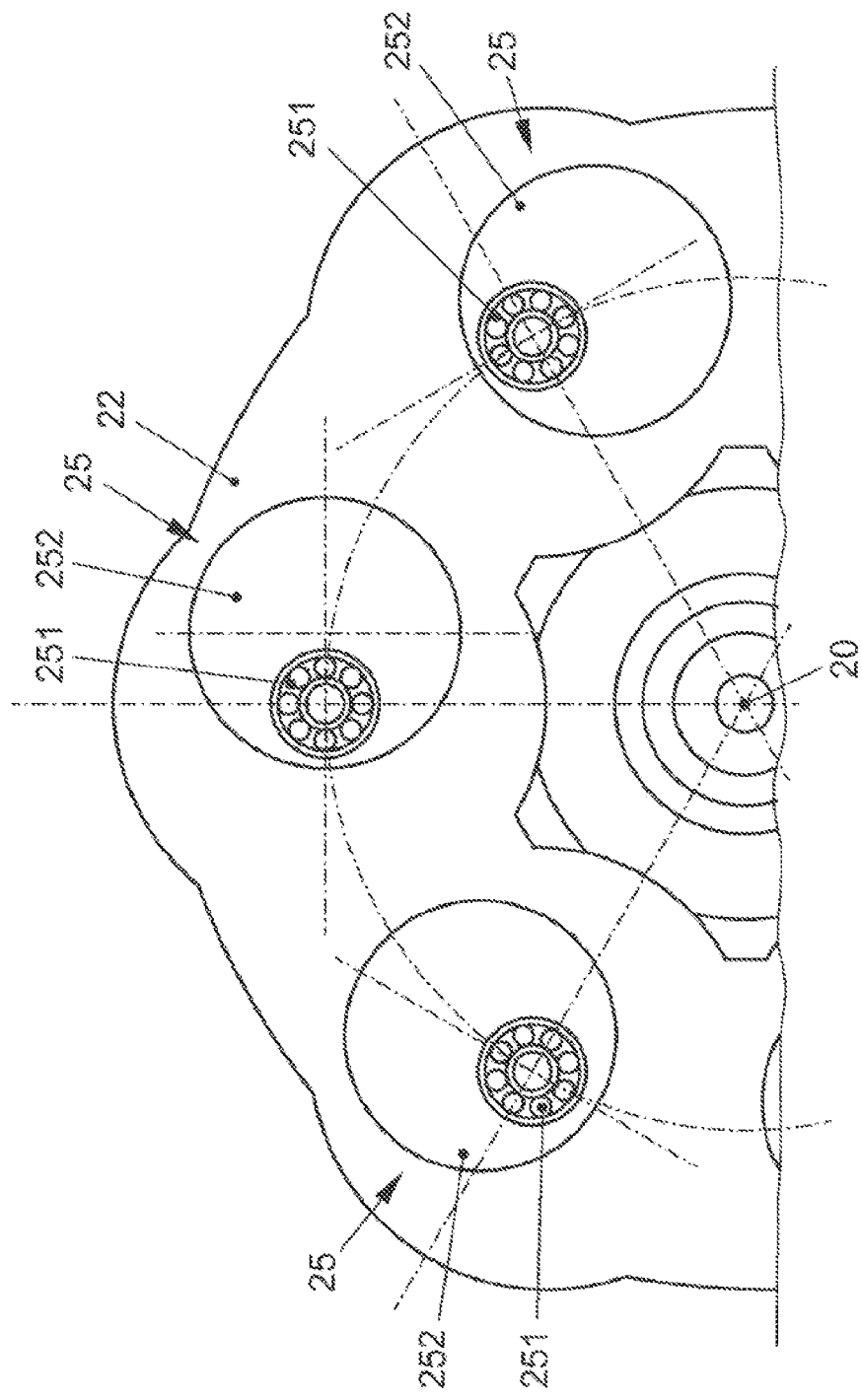
FIG. 5 is a diagrammatic view of the housing cover which separates the motor assembly of FIGS. 2 to 4 from the transmission stage of FIG. 1 for clarifying the function of the eccentric bearings in accordance with the invention.

The bearings 24 positioned on the side of the electric machines 12 facing away from the transmission stage 26 are formed as floating ball bearings. They take up radial forces, but do not put up any resistance either to axial forces or a tilting moment. This is sufficient since the bearing location of the bearing 24 can be considered as the pivot point of a tilting movement resulting from a radial displacement of the assigned transmission planet 28. By contrast, the bearings 25 disposed on the side of the electric machines facing toward the transmission stage 26 must have a radial degree of freedom. However, they must at the same time take up forces in the tangential direction (in relation to the motor ring). They are therefore formed as eccentric bearings 25, as can be seen in particular from FIGS. 4 and 5. The eccentric bearings 25 in the illustrated embodiment each include a ball bearing 251, which is fixed eccentrically in a bearing disc 252, which is in turn mounted rotatably in a cover of the housing 22. The eccentricity of the eccentric bearing 25, i.e. the directed distance between the center of the ball bearing 251 and the bearing disc 252, is oriented in the tangential direction (in relation to the motor ring). A radial displacement of the transmission planets 28 performed within the scope of the contact pressure adaptation thus leads to a tangent-parallel movement (in relation to the bearing disc 252), i.e. to a circular translation of the ball bearing 251. On account of the marginal magnitude of the displacements occurring within the scope of the contact pressure adaptation, this movement can be considered to be linear; its actual circular path nature can be neglected.

Figure 6:
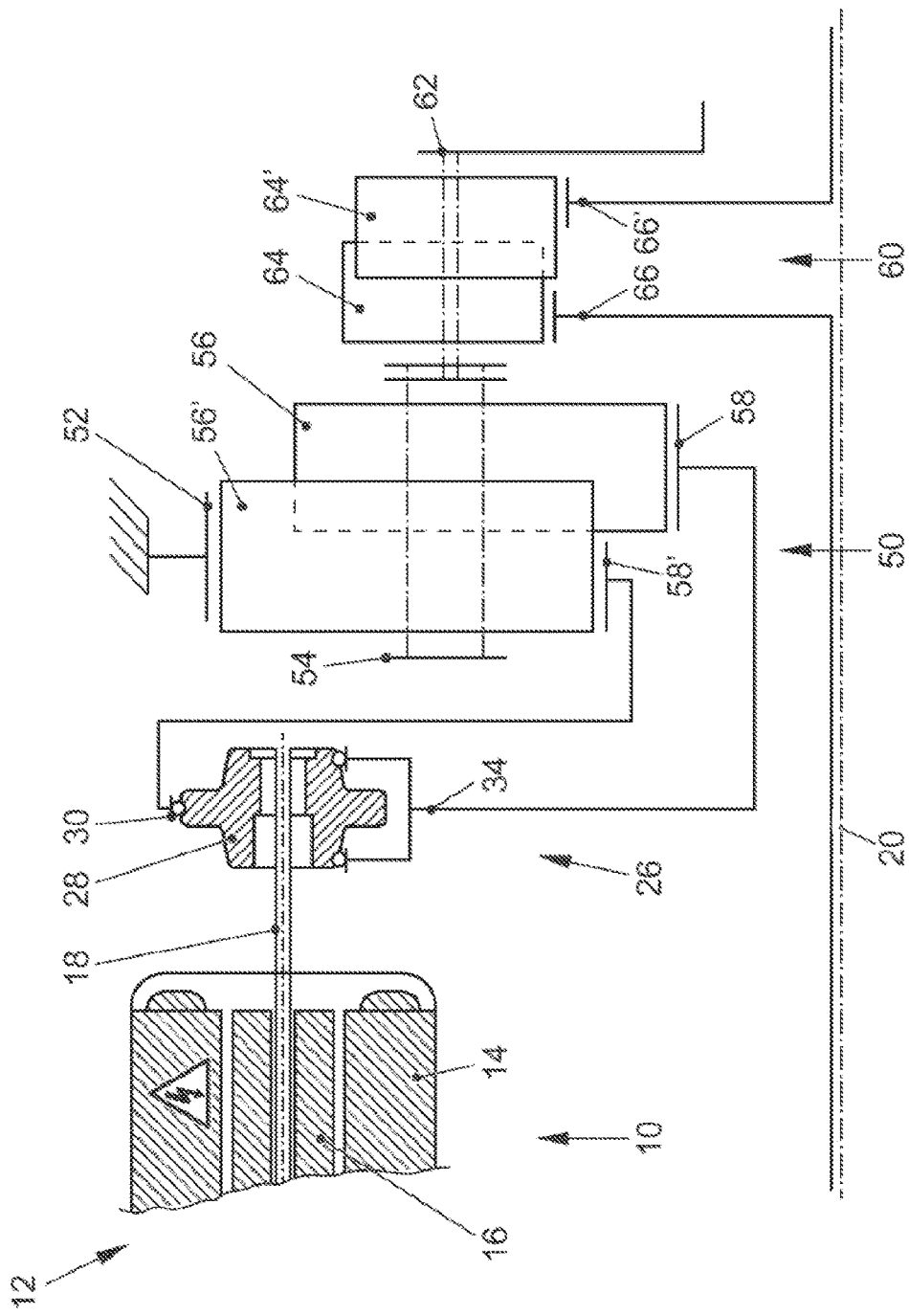
FIG. 6 is a diagrammatic view of a first embodiment of a drive assembly using the invention.

FIG. 6 shows the motor assembly 10 and the transmission stage 26 in a highly simplified illustration in order to illustrate the coupling thereof to downstream output elements of a motor vehicle drive assembly. As explained in detail above, the transmission ring gear 30 and the transmission sun 34 serve as output elements of the transmission stage 26. They are coupled to the input elements of a downstream summation stage 50, which is configured in the form of a Ravigneaux gear set which is preferably toothed on the end face. This has a summation ring gear 52 fixed relative to the housing and a summation carrier 54, on which two sets of summation planets 56, 56', which mesh with one another, are mounted. The summation planetary gear sets 56, 56' also mesh with two summation suns 58, 58', which serve as input elements of the summation stage 50 and are connected accordingly to the transmission sun 34 or the transmission ring gear 30. The summation stage 50 serves to combine the different speeds and torques which are present at the transmission ring gear 30 and the transmission sun 34.

In order to forward the rotational movement summed in the summation stage 50, a spur gear differential 60 is provided in the embodiment of FIG. 6 and is formed in the conventional manner of construction with a differential carrier 62, on which two sets of differential planets 64, 64', which mesh with one another, are mounted. The differential planetary gear sets 64, 64' mesh with two differential suns 66, 66', which serve as output elements of the differential 60 and are each connected to a driving wheel (not illustrated in greater detail in FIG. 6) of a motor vehicle. In the particularly preferred embodiment illustrated in FIG. 6, the summation carrier 54 and the differential carrier 62 form a common component having different axial portions, in one of which the summation planets 56, 56' are mounted and in the other of which the differential planets 64, 64' are mounted.

Figure 7:
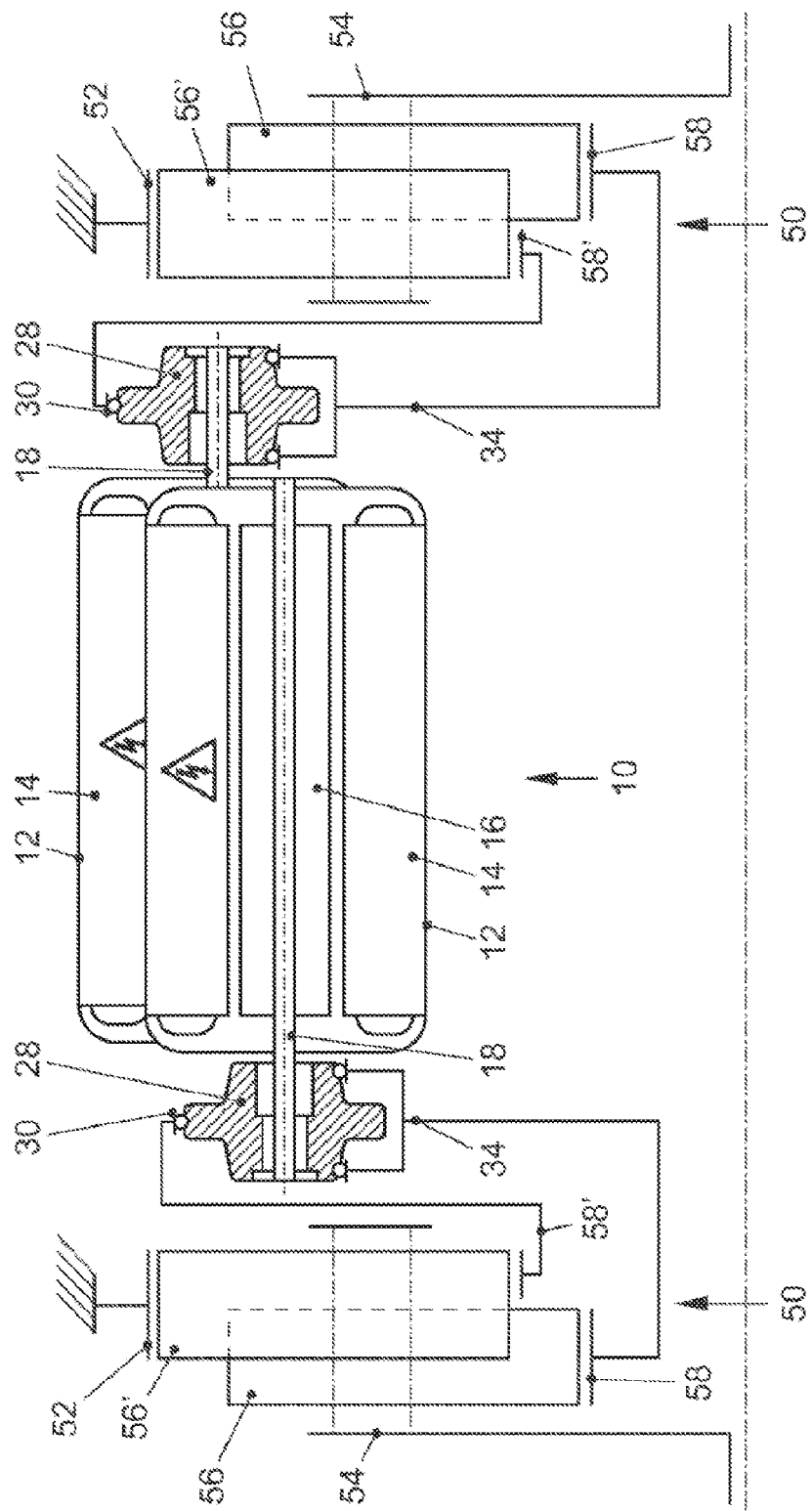
FIG. 7 is a diagrammatic view of a second embodiment of a drive assembly according to the invention.

FIG. 7 shows an alternative embodiment of a drive assembly for a motor vehicle which in particular dispenses with a differential 60. In contrast to the illustration of FIGS. 2, 3, and 4, the electric machines 12 in this embodiment are oriented anti-parallel to one another in groups, so that a transmission stage and adjoining summation stage 50 can be disposed on both sides of the motor ring. This configuration is shown in FIG. 7. Each of the two summation carriers 54 thus forms an independent output element of the drive assembly, which output element is connected to a directly driven driving wheel of the motor vehicle. All differential functions and also functions going therebeyond, such as what is known as torque vectoring, can be provided by appropriate control of the motor groups. Of course, it would also be possible to arrange a separate differential 60 downstream of each of the two summation stages 50 in the configuration of FIG. 7 and to thus provide two axles driven independently of one another.

Figure 8:
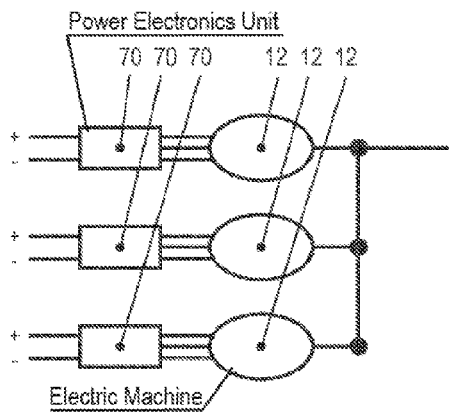
FIG. 8 is a schematic illustration of a first electrical interconnection variant for connecting electric machines and power electronics units in accordance with the invention.

FIG. 8 shows, in a highly schematic illustration, a possible electrical connection of the electric machines 12 of a drive according to the invention. Merely three electric machines 12 are illustrated, as is also the case in FIGS. 9 to 11 described hereinafter. A person skilled in the art will be aware, however, that the concepts shown by way of example can also be used with any plurality of electric machines 12. In the embodiment of FIG. 8, each individual electric machine 12 is electrically connected on the input side to a power electronics unit assigned exclusively thereto. On the output side, the torques of the electric machines 12 are coupled via the transmission stage (not illustrated in detail). The illustrated embodiment allows a maximum of control flexibility for the electric machines 12, but at the same time has the disadvantage of a significant cost outlay and installation space requirement for the large number of necessary power electronics units. The flexibility advantage can be further increased in particular in that the power electronics units 70, as indicated on the input side in FIG. 8, are coupled to different voltage sources, where appropriate having different voltage levels. Of course, it is also possible to feed all power electronics units 70 from the same voltage source.

Figure 9:
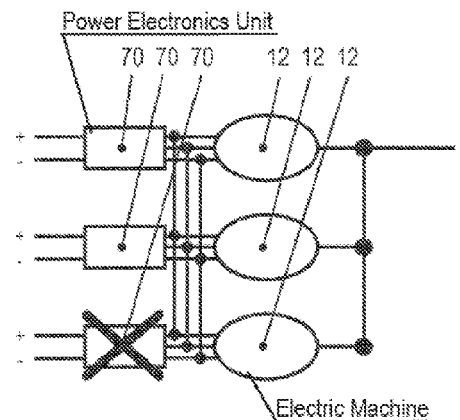
FIG. 9 is a schematic illustration of an electrical interconnection according to the invention as an alternative to the interconnection variant of FIG. 8.

FIG. 9 shows an alternative electrical connection, in which the sub-phases of the individual electric machines 12 are hard-wired to one another. This hard-wiring can be permanent or also switchable, as indicated in FIG. 9. As indicated in FIG. 9, it makes it possible to dispense with one or more power electronics units 70, wherein this omission can be fundamental or temporary. With a fundamental omission of one or more power electronics units (compared to the circuit variant of FIG. 8), corresponding power electronics units are not even provided when devising the drive according to the invention. By contrast, in the case of a temporary omission, power electronics units are provided which are connected or disconnected only as required. This variant lends itself in particular in conjunction with the switchable hard-wiring of the sub-phases of the electric machines 12.

Figure 10:
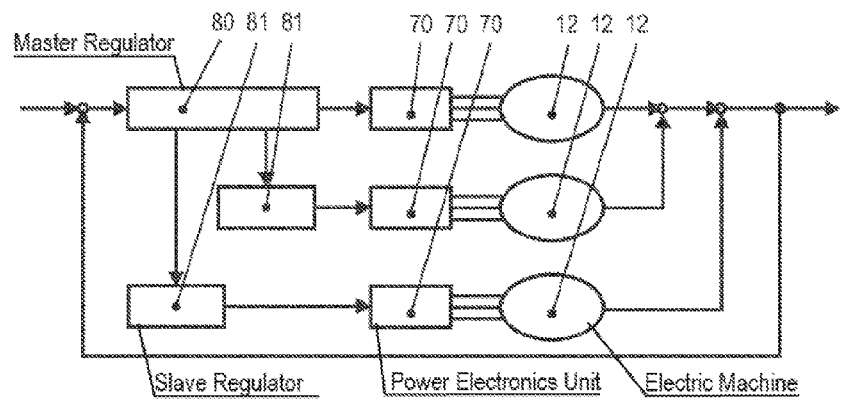
FIG. 10 is a schematic illustration of a first electrical interconnection variant for regulating the electric machines in accordance with the invention.

FIG. 10 shows a first electrical connection alternative with regard to the regulation of the electric machines 12 or the power electronics units 70 controlling them. A master regulator 80 is provided on the input side of the power electronics units 70 and receives movement parameters fed back to the elements of the drive train following the drive according to the invention via a sensor system (not illustrated in greater detail). The master regulator determines on this basis, together with a target set point fed thereto, the control parameters for all power electronics units 70. It transfers these control parameters partly directly and partly via slave regulators 81 disposed downstream thereof to the power electronics units 70.

Figure 11:
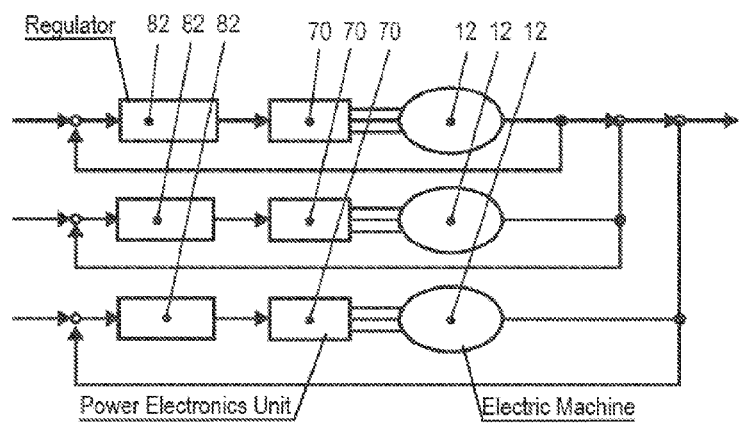
FIG. 11 is a schematic illustration of an electrical interconnection according to the invention as an alternative to the electrical interconnection of FIG. 10.
Figure 12:
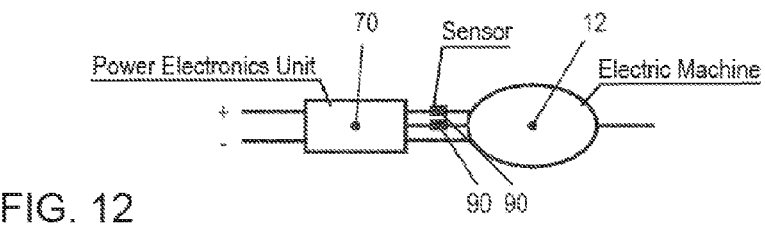
FIG. 12 is a schematic illustration of the sub-phase sensor technology in accordance with the invention.

FIG. 11 shows an alternative electrical connection, in which all power electronics units 70 are controlled via equally entitled regulators 82. Each of the regulators 82 receives movement parameters from components of the drive train disposed downstream of the drive according to the invention. This additional outlay caused by sensor technology and circuitry is profitable in particular when the determined movement parameters are assigned specifically to individual electric machines 12 and can be fed back to the regulators 82 assigned thereto. Of course, in this variant, each individual regulator 82 must also be provided with an individual target set point. For correct regulation of electric machines 12, the detection of electrical parameters, in particular the current on the individual sub-phases, is typically also necessary in addition to the detection of mechanical parameters. For this purpose, the sub-phases are typically provided with individual current sensors 90. By use of synergy effects, as indicated in FIG. 12, it is possible to dispense with individual sub-phase current sensors 90 within the scope of the invention when the required information can be determined by evaluation of redundancies by measurement of corresponding currents in sub-phases of other electric machines 12.

Figure 13:
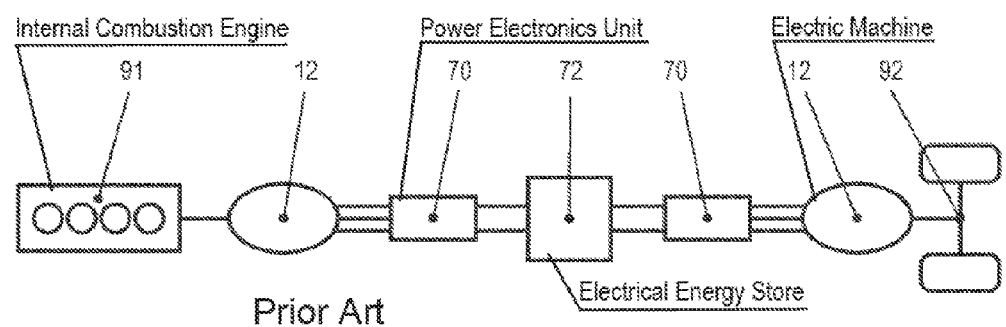
FIG. 13 is a schematic illustration of a serial hybrid drive train according to the prior art.

FIG. 13 shows a typical construction of a conventional drive train in accordance with the principle of a serial hybrid drive. An internal combustion engine 91 drives an electric machine 12 operated as a generator, which feeds the generated electrical energy into an electric store 72 via a power electronics unit 70. This in turn supplies a further power electronics unit 70, which controls an electric machine 12 operated as a motor. This is connected on the output side to the output 92 of the motor vehicle.

Figure 14:
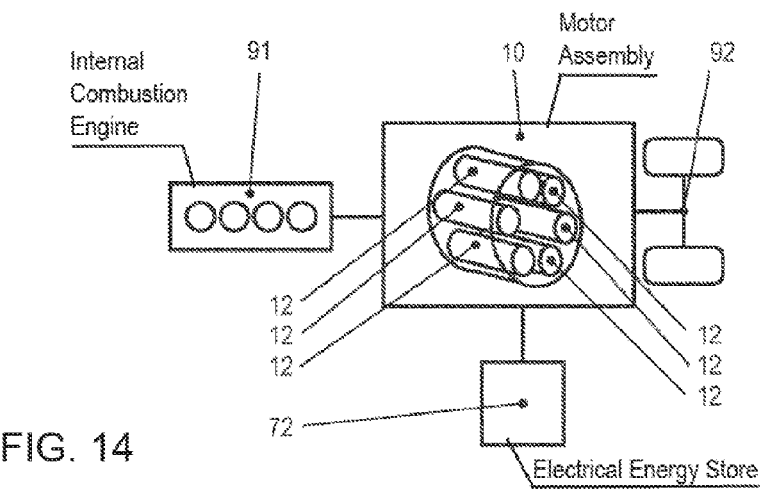
FIG. 14 is a schematic illustration of a serial hybrid drive train in accordance with the use of the invention.

FIG. 14, by contrast, shows a serial hybrid drive with use of the present invention. Here, some of the electric machines 12 provided within the motor assembly 10 are operated as a generator and are connected to the internal combustion engine 91. Other electric machines 12, by contrast, are operated as a motor and are connected to the output 92. The power electronics units (not illustrated separately in FIG. 14) interact with the electrical energy store 72 in the above-described manner.

Of course, the embodiments discussed in the specific description and shown in the drawings are merely illustrative exemplary embodiments of the present invention. A person skilled in the art is provided with a wide range of possible variations in light of the disclosure provided here.

What is claimed is:

1. An electric drive, comprising:
   a motor assembly including a plurality of electric machines with motor shafts disposed parallel but not coaxial to one another;
   an output assembly;
   a transmission stage connected to said motor assembly and also connected to said output assembly;
   said transmission stage having a transmission sun connected to said output assembly and having a plurality of transmission planets each connected to a respective one of said electric machines, said transmission planets each being disposed coaxial with a respective one of said motor shafts and being securely fixed on said respective one of said motor shafts and being disposed in an annular manner around said transmission sun and rolling on said transmission sun in a torque-transmitting manner; and
   one or more power electronics units connected to one or more electric voltage sources, said one or more power electronics units controlling electrical sub-phases of said electric machines, each of said power electronics units being regulated via a respective regulator, wherein movement parameters of at least one of said output assembly and said transmission stage are fed back to said respective regulator.

2. The electric drive according to claim 1, wherein each respective one of said electric machines is connected to a respective separate one of said power electronics units.

3. The electric drive according to claim 1, wherein two or more of said electric machines are electrically connected to one another and are thus connected or connectable to a same one of said power electronics units.

4. The electric drive according to claim 1, wherein different ones of said power electronics units are connected to respective different ones of said electric voltage sources.

5. The electric drive according to claim 1, including:
   regulators, each of said power electronics units being regulated via a respective one of said regulators, wherein movement parameters of at least one of said output assembly and said transmission stage are fed back to at least one of said regulators; and
   a given one of said regulators for a given one of said power electronics units being configured as a master regulator and further ones of said regulators for respective further ones of said power electronics units being configured as slave regulators, said slave regulators being dependent on said master regulator.

6. The electric drive according to claim 1, wherein all of said regulators are configured as individual regulators independent of one another.

7. The electric drive according to claim 1, including sensors for a direct detection of values of given operating parameters in some of said electric machines and for estimating values, not directly detected, of the given operating parameters in other ones of said electric machines.

8. The electric drive according to claim 1, wherein said electric machines are grouped according to different construction types.

9. The electric drive according to claim 1, wherein:
   said electric machines are provided in groups such that said electric machines are grouped according to different construction types; and
   sensors are provided for a direct detection of values of given operating parameters in some of said electric machines and also for estimating values, not directly detected, of the given operating parameters in other ones of said electric machines such that for a given one of said given operating parameters only one corresponding one of said sensors is provided for each respective one of said groups.

10. The electric drive according to claim 1, wherein said electric machines are controlled differently in groups.

11. The electric drive according to claim 1, including:
    sensors for a direct detection of values of given operating parameters in some of said electric machines and also for estimating values, not directly detected, of the given operating parameters in other ones of said electric machines; and
    said electric machines being controlled differently in groups such that for a given one of said given operating parameters only one corresponding one of said sensors is provided for each respective one of said groups.

12. The electric drive according to claim 1, including current sensors provided for a direct detection of some controlled sub-phases and for an estimation of other sub-phases, not directly detected, of said electric machines.

13. The electric drive according to claim 1, including position sensors provided for a direct detection of rotational positions of some of said electric machines and for an estimation of rotational positions, not directly detected, of other ones of said electric machines.

14. The electric drive according to claim 1, including temperature sensors provided for a direct detection of temperatures of some of said electric machines and for an estimation of temperatures, not directly detected, of other ones of said electric machines.

15. A method for operating an electric drive, the method comprising:
provarding a motor assembly, an output assembly, and a transmission stage, wherein the motor assembly has a plurality of electric machines with motor shafts disposed parallel but not coaxial to one another, wherein the transmission stage is connected to the motor assembly and also connected to the output assembly, wherein the transmission stage has a transmission sun connected to the output assembly and has a plurality of transmission planets each connected to a respective one of the electric machines, wherein the transmission planets are each disposed coaxial with a respective one of the motor shafts, are securely fixed on the respective one of the motor shafts and are disposed in an annular manner around the transmission sun and roll on the transmission sun in a torque-transmitting manner;
controlling electrical sub-phases of the electric machines with one or more power electronics units connected to one or more electric voltage sources, wherein each of the power electronics units is regulated via a respective regulator, and wherein movement parameters of at least one of the output assembly and the transmission stage are fed back to the respective regulator; and
controlling the electric machines differently in groups.

16. The method according to claim 15, wherein the step of controlling the electric machines differently in groups includes operating a first group of the electric machines as a motor and operating a second group of the electric machines as a generator.

17. The method according to claim 15, wherein the step of controlling the electric machines differently in groups includes operating different groups of the electric machines with a different slip of their transmission planets relative to the transmission sun.

18. The method according to claim 15, wherein the step of controlling the electric machines differently in groups includes operating, with a time offset relative to one another, different groups of the electric machines temporarily with overload and temporarily with underload.

19. A serial hybrid drive train for a motor vehicle, comprising:
an internal combustion engine;
an electrical energy store;
an electric drive including a motor assembly with a plurality of electric machines, said electric machines having motor shafts disposed parallel but not coaxial to one another;
said electric drive further including an output assembly, a transmission stage and one or more power electronics units connected to one or more electric voltage sources, said one or more power electronics units controlling electrical sub-phases of said electric machines, each of said power electronics units being regulated via a respective regulator, wherein movement parameters of at least one of said output assembly and said transmission stage are fed back to said respective regulator;
at least one of said electric machines being coupled mechanically to said internal combustion engine and electrically to said electrical energy store and being operable as a generator;
at least one of said electric machines being coupled mechanically to said output assembly and electrically to said electrical energy store and being operable as a motor;
said transmission stage being connected to said motor assembly and also connected to said output assembly;
said transmission stage having a transmission sun connected to said output assembly and having a plurality of transmission planets each connected to a respective one of said electric machines, said transmission planets each being disposed coaxial with a respective one of said motor shafts and being securely fixed on said respective one of said motor shafts and being disposed in an annular manner around said transmission sun and rolling on said transmission sun in a torque-transmitting manner; and
said electric machines being controlled differently in groups such that a first group of said electric machines is operable as a motor and a second group of said electric machines is operable as a generator.

* * * * *